United States Patent
Hoge et al.

(10) Patent No.: US 7,016,151 B2
(45) Date of Patent: Mar. 21, 2006

(54) TAPE CARTRIDGE IMPROVED BOSS DOOR

(75) Inventors: David T. Hoge, Westminister, CO (US); William J. Vanderheyden, Loveland, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/491,396

(22) PCT Filed: Oct. 9, 2001

(86) PCT No.: PCT/US01/42585

§ 371 (c)(1),
(2), (4) Date: Mar. 31, 2004

(87) PCT Pub. No.: WO03/041079

PCT Pub. Date: May 15, 2003

(65) Prior Publication Data

US 2004/0184389 A1    Sep. 23, 2004

(51) Int. Cl.
*G11B 23/107* (2006.01)
*G11B 23/04* (2006.01)

(52) U.S. Cl. .................................................... 360/132
(58) Field of Classification Search .............. 360/131, 360/132; 242/348, 348.1, 348.2, 348.3, 338
See application file for complete search history.

(56) References Cited

U.S. PATENT DOCUMENTS

| | | | | |
|---|---|---|---|---|
| 4,477,851 A | * | 10/1984 | Dalziel et al. | 360/132 |
| 5,294,072 A | * | 3/1994 | East et al. | 360/132 |
| 5,543,993 A | * | 8/1996 | Argumedo et al. | 360/132 |
| 5,610,789 A | | 3/1997 | Miller | |
| 6,175,470 B1 | | 1/2001 | Stamm | |
| 6,271,991 B1 | | 8/2001 | Saliba et al. | |
| 6,488,223 B1 | * | 12/2002 | Hayashi | 360/132 |
| 6,739,539 B1 | * | 5/2004 | Hiraguchi et al. | 360/132 |

FOREIGN PATENT DOCUMENTS

| | | |
|---|---|---|
| EP | 0537714 A2 | 4/1993 |
| JP | 9274785 | 10/1997 |
| JP | 9274787 | 10/1997 |
| JP | 11328922 A * | 11/1999 |
| WO | WO 99/42999 A1 | 8/1999 |

* cited by examiner

*Primary Examiner*—William Korzuch
*Assistant Examiner*—Christopher R. Magee
(74) *Attorney, Agent, or Firm*—Morrison & Foerster LLP

(57) ABSTRACT

The tape cartridge improved boss door provides a sleeve between the lower boss for the torsion spring to rotate around to decrease the stress applied to the top coil of the torsion spring. An improved catch contacts the top leg of the torsion spring at a point distant from the torsion spring coils to further reduce the force applied to the torsion spring and the frictional drag as the torsion spring rotates around the sleeve, thus decreasing the failure rate of the tape cartridge due to premature failure of the torsion spring.

3 Claims, 2 Drawing Sheets

TAPE CARTRIDGE IMPROVED BOSS DOOR

FIELD OF THE INVENTION

This application is a 371 of PCT/US01/42585 Oct. 9, 2001

The invention relates to digital tape cartridges, and in particular, to an improved boss door for a single reel tape cartridge.

PROBLEM

It is a problem in the field of tape cartridges with door assemblies that utilize boss components and a torsion spring to prevent tape cartridge failure caused by exerting undue stress on the torsion spring while also providing a method for automatically pivoting the door assembly open and closed when the tape cartridge is inserted into or removed from the tape drive.

Single reel tape cartridges have a pivoting door that pivots open when the tape cartridge is inserted into the tape drive to expose the enclosed magnetic tape media for operation. The existing single reel tape cartridge boss door assembly is best described reading the following description in conjunction with the prior art illustrated in FIGS. 1 and 2.

Torsion Spring Rotation—FIG. 1:

Referring to FIG. 1, the prior art boss door 130 assembly utilizes a cylindrical post 110 integral to tape cartridge 100 and extending from cover 102 to base 104 of tape cartridge 100 and an upper boss 132 and a lower boss 134 integral to door 130. The upper and lower bosses 132 and 134 include a cylindrical-shaped hole formed therein to fit over the cylindrical post. When assembled, upper and lower boss, 132 and 134 respectively, rotate on cylindrical post 110. Lower boss 134 is positioned on door 130 to create an area between lower boss 134 and base 104 of tape cartridge housing 100 for torsion spring 120 to rotate around cylindrical post 110. The inside diameter of torsion spring 120 is significantly less than the outside diameter of the cylindrical post 110 allowing torsion spring 120 to freely move from side to side and to rotate around cylindrical post 110. Torsion spring 120 has a straight top leg 122 and a straight bottom leg 124 that extend perpendicular a distance from torsion spring 120 coils. Top leg 122 is located adjacent to the base of lower boss 134 and bottom leg 124 is located at base 104 of tape cartridge 100 housing and is retained against tape cartridge 100 side wall 106.

A first problem with the prior art boss door 130 is that as the boss door 130 pivots, the diameter of the top coil of torsion spring 120 decreases causing the top coil to rub against cylindrical post 110. The rubbing creates a frictional drag that keeps the top coil of the torsion spring 120 from rotating freely around cylindrical post 110 which subsequently increases the stress applied to top leg 122 of torsion spring 120. This stress is compounded by the distance between torsion spring 120 and cylindrical post 110 which allows torsion spring 120 to shift closer to one side of cylindrical post 110 than the other side. The increased stress on top leg 122 of torsion spring 120 may result in tape cartridge failure due to premature failure of torsion spring 120.

Rectangular Catch—FIG. 2:

Referring to FIG. 2, boss door 130 also includes a rectangular catch 136 projecting from boss door 130 below the bottom boss. Catch 136 is a rectangular projection having right angle corners. When door 130 is in the closed position, the force applied by top leg 122 of torsion spring 120 to rectangular catch 136 holds door 130 closed. When the tape cartridge 100 is inserted into the tape drive, rectangular catch 136 applies a force on top leg 122 pushing top leg 122 toward lower leg 124 until boss door 130 is fully open. As tape cartridge 100 is removed from the tape drive, the force holding door 130 open is relieved and top leg 122 of torsion spring 120 exerts a force on rectangular catch 136, pivoting door 130 to a closed position.

A second problem with the prior art boss door occurs when rectangular catch 136 contacts with top leg 122 of torsion spring 120 at a point proximal to the coils. Referring to FIG. 2, the end of the rectangular catch 136 rotates in close proximity to torsion spring 120 coils and therefore interfaces with top leg 122 of torsion spring 120 proximate the coils. Contact at this point on top leg 122 of torsion spring 120 generates additional tension on the top coil of torsion spring 120, thus increasing the frictional drag as torsion spring 120 rotates around cylindrical post 110.

This problem is exacerbated by the construction of rectangular catch 136. Rectangular catch 136 has a sharp corner where rectangular catch 136 interfaces with top leg 122 of torsion spring 120. As boss door 130 pivots against top leg 122 of tension spring 120, only the sharp edge of rectangular catch 136 and a corresponding section of torsion spring 120 top leg 122 make contact. Contacting top leg 122 or torsion spring 120 at only one point that is distal from the coils increases the force required to rotate the boss door 130 which places an increased stress on torsion spring 120.

The boss door just described exerts unnecessary stress on the torsion spring resulting in failure of the tape cartridge due to premature torsion spring failure. For these reasons, a need exists for an improved boss door that reduces the stress placed on the torsion spring to eliminate unnecessary tape cartridge failure.

SOLUTION

The present tape cartridge improved boss door provides an improvement that reduces the stress exerted on the torsion spring, thus decreasing the frictional drag as the torsion spring rotates around the cylindrical post. The improved boss door also reduces the force required to pivot the boss door open by relieving the tension on the torsion spring, thus reducing the failure rate of the tape cartridge due to premature failure of the torsion spring.

Torsion Spring Rotation:

The improved boss door provides a sleeve extending from the lower boss to the base of the tape cartridge. The outside diameter of the sleeve is slightly less than the inside diameter of the torsion spring and the torsion spring rotates around the sleeve. The sleeve fills the gap between the cylindrical post and the torsion spring to prevent the torsion spring from shifting closer to one side of the post than the other side, thus decreasing the stress applied to the top coil of the torsion spring. Providing a sleeve extending from the lower boss makes the improved boss door assembly compatible with existing tape cartridge housings utilizing a boss door while reducing the force required to rotate the improved boss door open.

Triangular Catch:

The improved boss door also replaces the rectangular catch with an improved catch that contacts a distal point on the torsion spring top leg. The improved catch is a triangular member that protrudes from the boss door. The sides of the triangular member do not interface with the top leg of the torsion spring. Instead, only one corner of the triangular member comes into contact with the top leg of the torsion spring. The point of contact is a point on the top leg distal from the torsion spring top coil. Contact with the torsion spring top leg at a point distal from the coils relieves the tension on the top coil as the boss door pivots open, thus reducing the frictional drag as the torsion spring rotates around the sleeve. The reduction in frictional drag decreases the force required to open the door.

A sleeve to fill the gap between the torsion spring and the cylindrical post provides an improved boss door that reduces the stress applied to the torsion spring, thus decreasing the failure rate of the tape cartridge due to premature failure of the torsion spring. Providing an improved catch that contacts the torsion spring top leg at a point distal from the coils further reduces the stress applied to the torsion spring. Improving the mechanical characteristics to the door assembly without requiring improvements to the existing tape cartridge housing allows the improved boss door to be attached to existing tape cartridge housings, thus reducing the cost to manufacture tape cartridges with improved boss doors.

DETAILED DESCRIPTION

Figure 1:
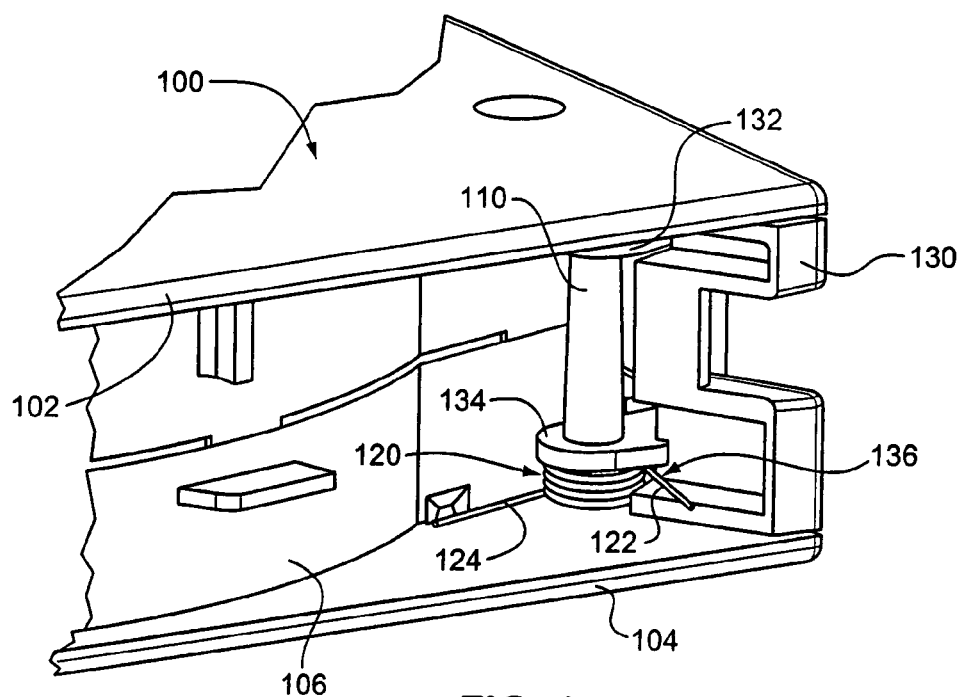
FIG. 1 illustrates a perspective view of the prior art boss door.
Figure 2:
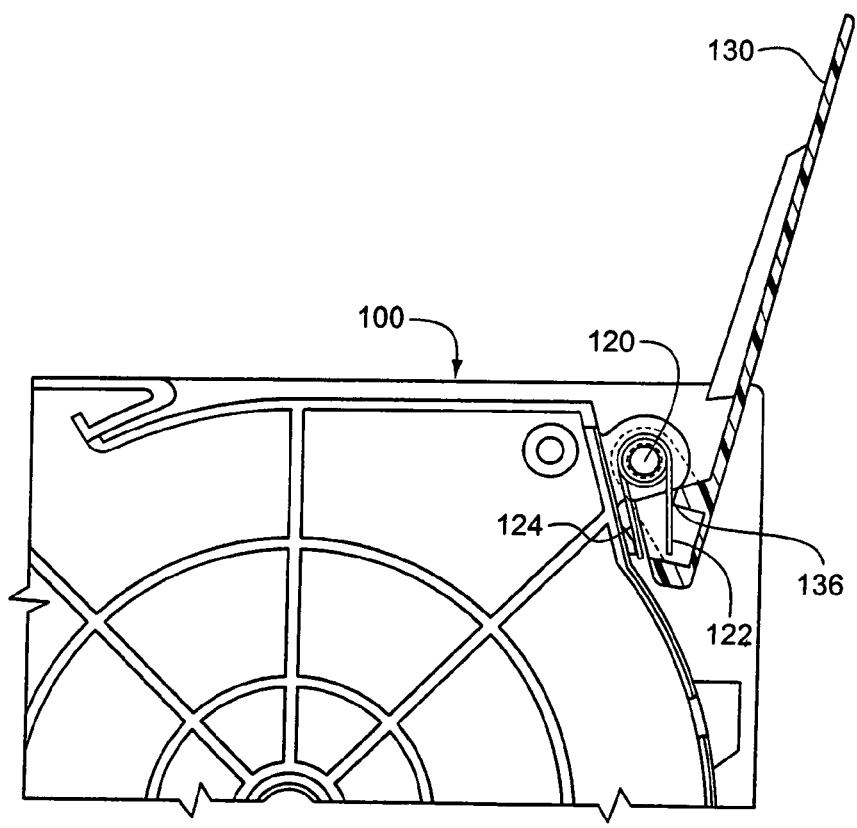
FIG. 2 is a top view of the prior art boss door.

The tape cartridge improved boss door summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

The present tape cartridge improved boss door for single reel tape cartridges provides a sleeve attached to the lower boss that reduces the stress exerted on the torsion spring, thus decreasing the frictional drag as the torsion spring rotates around the sleeve. The improved boss door also reduces the force required to pivot the boss door open by relieving the tension on the torsion spring created by the rectangular catch by replacing the rectangular catch with a triangular catch.

As previously described in the prior art, boss door 230 assembly utilizes a cylindrical post 210 integral to tape cartridge 100 and extending from cover 202 to base 204 of tape cartridge 200 and an upper boss 232 and a lower boss 234 integral to door 230. The upper and lower bosses 232 and 234 include a cylindrical-shaped hole formed therein to fit over cylindrical post 210. When assembled, upper and lower boss, 132 and 134 respectively, rotate on cylindrical post 110. Upper boss 232 has not changed, however, lower boss 234 has been improved.

Figure 3:
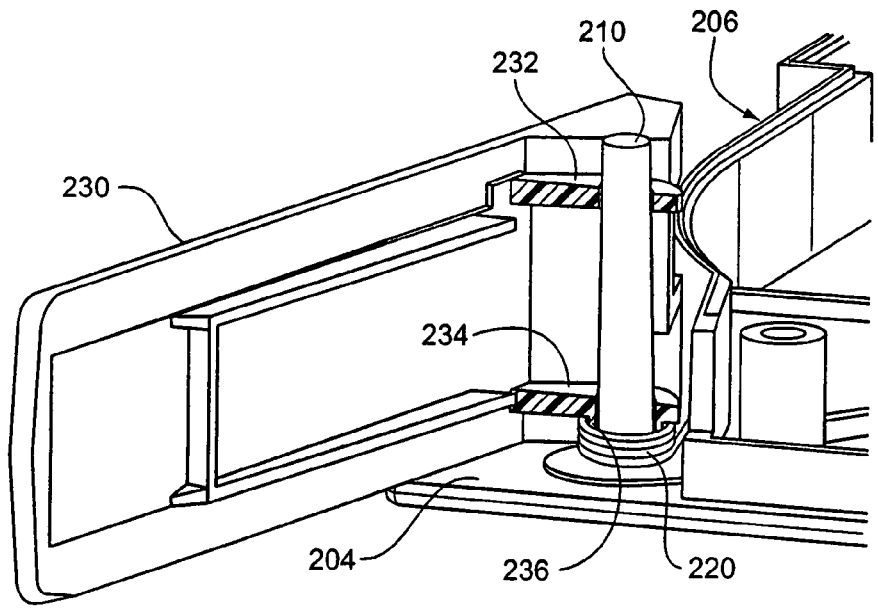
FIG. 3 illustrates a perspective view of the tape cartridge with a cross sectional view of the improved boss door.

Lower Boss with Sleeve—FIG. 3:

Referring to FIG. 3, lower boss 234 includes a sleeve 236 that projects perpendicularly downward from lower boss 234 approximately to base 204 of tape cartridge 200. The outside diameter of sleeve 236 is less than the inside diameter of torsion spring 220. When assembled, torsion spring 220 rotates around sleeve 236 as boss door 230 pivots. Top leg 222 of torsion spring 220 extends outward from the top coil of torsion spring 220 adjacent lower boss 234. Bottom leg 224 of torsion spring 220 extends outward from the bottom coil of torsion spring 220 along base 204 of tape cartridge 200 housing. When the improved boss door 230 pivots, bottom leg 224 of torsion spring 220 is held securely against side wall 206 of tape cartridge 200 housing as top leg 222 of torsion spring 220 rotates toward bottom leg 224 of torsion spring 220.

Sleeve 236 eliminates the gap between the cylindrical post 210 and torsion spring 220 as was found in the prior art tape cartridge boss door assemblies. Reducing the gap prevents torsion spring 220 from shifting to one side or the other of sleeve 236 as boss door 230 rotates around cylindrical post 210, thus reducing the tension placed on torsion spring 220 during operation.

Providing sleeve 236 integrally formed to lower boss 234 does not require the tape cartridge 200 housing to be modified to operate with the improved boss door 230. Instead, the improved boss door can be attached to existing tape cartridges to decrease the failure rate of the tape cartridges. An improved catch integrally formed to the improved boss door further reduces the tension placed on the torsion spring.

Figure 4:
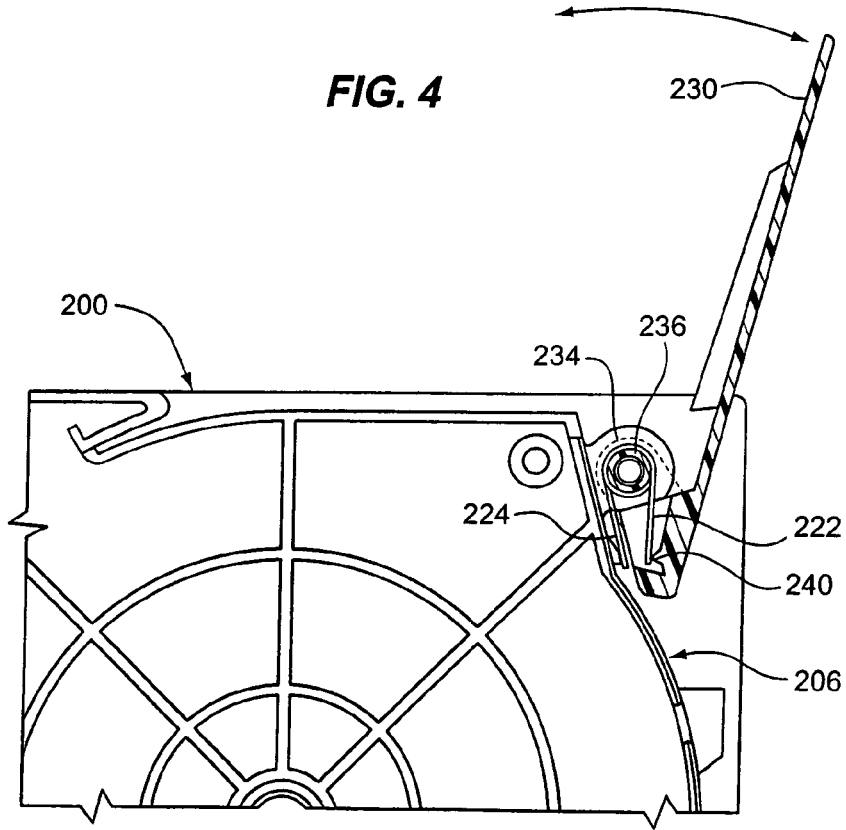
FIG. 4 is a top view of the improved boss door.

Triangular Catch—FIG. 4:

Referring to FIG. 4, improved boss door 230 provides a triangular catch 240 integrally formed to the back surface of improved boss door 230 directly below lower boss 234. Triangular catch 240 projects from the back surface such that one corner of triangular catch 240 makes contact with top leg 222 of torsion spring 220. The point of contact is a point on top leg 222 distal from the top coil of torsion spring 220. The triangular catch 240 maintains the point of contact as boss door 230 pivots between and open and a closed position.

Contacting top leg 222 of torsion spring 220 at a point distal from the top coil decreases the force required to pivot boss door 230 open. Improving boss door 230 by replacing the rectangular catch with triangular catch 240 combined with providing sleeve 236 for torsion spring 220 to rotate overcomes the problem of placing undue stress on torsion spring 220 which generated a frictional drag as boss door 230 rotated open.

Operational Characteristics—FIGS. 3 and 4:

Referring to FIG. 3, with boss door 230 closed, bottom leg 224 of torsion spring 220 rests against side wall 206 of tape cartridge 200 housing and top leg 222 of torsion spring 220 rests against the corner of triangular catch 240 to hold improved boss door 230 closed. Referring to FIG. 4, as improved boss door 230 rotates toward an open position, triangular catch 240 places a force on top leg 222 causing the coil of torsion spring 220 to begin to tighten against sleeve 236. Placing the force at a point on torsion spring 220 top leg 222 distal from torsion spring 220 top coil reduces the force required to pivot improved boss door 230, thus reducing the stress placed on torsion spring 220.

Providing sleeve 236 for torsion spring 220 to rotate around prevents torsion spring 220 from shifting to one side or the other, overcoming the problem of torsion spring 220 rubbing against cylindrical post 210. Preventing the rubbing reduces or eliminates the frictional drag that kept torsion spring 220 from rotating freely around the cylindrical post 210 in the prior art. Reducing or eliminating the frictional drag further decreases the force required to pivot boss door 230 open, thus further reducing the stress placed on torsion spring 220 top leg 222.

The improved boss door has been illustrated and described with improvements to the lower boss and the catch located on the back surface of the boss door. Improving the boss door while maintaining the existing characteristics of the tape cartridge housing provides an improved boss door that is compatible with existing tape cartridge housings. Eliminating the need to manufacture a new tape cartridge housing to utilize the improved boss door reduces the cost to manufacture a tape cartridge utilizing the improved boss door to reduce tape cartridge failure due to premature torsion spring failure.

In an embodiment of the tape cartridge improved boss door (not illustrated), a sleeve is integrally formed to the post and the torsion spring rotates around the sleeve. As previously discussed, the triangular catch integral to the improved boss door makes contact with the top leg of the torsion spring at a point distal from the tension spring coils. While the embodiment just described is not compatible with existing tape cartridge housing, an improved tape cartridge having a sleeve integrally formed to the tape cartridge reduces the stress applied to the torsion spring. Combining the improved tape cartridge housing with an improved boss door having the improved catch further reduces the tension applied to the torsion spring to prevent premature failure of the tape cartridge due to torsion spring failure.

As to alternative embodiments, those skilled in the art will appreciate that the present tape cartridge improved boss door can be configured with improvements to the boss door and the tape cartridge housing. While the lower boss sleeve improvement can be incorporated by modifying the tape cartridge post, it would be necessary to manufacture a new tape cartridge housing as well as a boss door with the improved catch to reduce premature failure of the torsion spring.

It is apparent that there has been described, a tape cartridge improved boss door that fully satisfies the objects, aims, and advantages set forth above. While the door assembly has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. An improved door for a tape cartridge having a housing, the housing comprising a cover, base, a post extending between the cover and the base, a door having an upper and a lower boss, the upper and lower boss having a cylindrical-shaped hole formed therein to fit over the post, the upper and lower boss rotating on the post, and a torsion spring located between the lower boss and the tape cartridge housing base, the torsion spring having a plurality of coils, a top leg and a bottom leg, the improved door comprising:

a sleeve integral to and extending downward from the lower boss to the base, wherein the torsion spring rotates around the sleeve to reduce stress applied to the torsion spring as the door rotates to an open position.

2. The improved door of claim 1, further comprising:

a catch to make contact with the torsion spring top leg, wherein the catch contacts the top leg distal from the plurality of coils to reduce the force required to pivot the door open and to reduce the stress applied to the torsion spring.

3. An improved door for a tape cartridge having a housing that encloses a single reel on which is wound a length of tape media, the housing having a cover, a base and a post integral to the housing, a door having an upper and a lower boss wherein the upper and lower boss rotate around the post as the door pivots between an open and a closed position, and a torsion spring located between the lower boss and the base of the tape cartridge housing, the torsion spring having a plurality of coils, a top leg and a bottom leg, the improved door comprising:

a sleeve integral to the lower boss, the sleeve extending downward between the lower boss and the base, an improved catch integral to the door to make contact with the torsion spring top leg, wherein the improved catch contacts the top leg distal from the plurality of coils and as the improved catch applies a force to the top leg, the torsion spring rotates around the sleeve reducing the stress applied to the plurality of coils as the door rotates open.

\* \* \* \* \*